(12) United States Patent
Rodrigues et al.

(10) Patent No.: US 10,566,787 B2
(45) Date of Patent: Feb. 18, 2020

(54) INRUSH CURRENT DETECTION AND CONTROL WITH SOLID-STATE SWITCHING DEVICES

(71) Applicant: ABB S.p.A., Sesto San Giovanni (IT)

(72) Inventors: Rostan Rodrigues, Raleigh, NC (US); Taosha Jiang, Cary, NC (US); Yu Du, Raleigh, NC (US)

(73) Assignee: ABB S.P.A., Milan (IT)

(*) Notice: Subject to any disclaimer, the term of this patent is extended or adjusted under 35 U.S.C. 154(b) by 309 days.

(21) Appl. No.: 15/792,887

(22) Filed: Oct. 25, 2017

(65) Prior Publication Data
US 2019/0123549 A1   Apr. 25, 2019

(51) Int. Cl.
H02H 9/02 (2006.01)
G06F 1/26 (2006.01)
G06F 1/28 (2006.01)

(52) U.S. Cl.
CPC ............. *H02H 9/025* (2013.01); *G06F 1/26* (2013.01); *G06F 1/266* (2013.01); *G06F 1/28* (2013.01)

(58) Field of Classification Search
CPC .. G06F 1/26; G06F 1/266; G06F 1/28; H02H 9/025
USPC .......................................................... 361/35
See application file for complete search history.

(56) References Cited

U.S. PATENT DOCUMENTS

| | | | |
|---|---|---|---|
| 4,328,459 A | 5/1982 | McLeod, Jr. | |
| 4,494,064 A | 1/1985 | Harkness | |
| 6,150,800 A | 11/2000 | Kinoshita et al. | |
| 6,335,654 B1 | 1/2002 | Cole | |
| 7,760,479 B2 | 7/2010 | Garrett | |

(Continued)

FOREIGN PATENT DOCUMENTS

| CN | 105207232 A | 12/2015 |
|---|---|---|
| FR | 2858881 A1 | 2/2005 |

(Continued)

OTHER PUBLICATIONS

ATS021, ATS022 Automatic Transfer Switches; ABB; 2009; 4 pgs.; Bergamo, Italy; Link available at: http://new.abb.com/docs/librariesprovider22/technical-documentation/ats-021_022.pdf; Last accessed on Oct. 24, 2017.

(Continued)

*Primary Examiner* — Kevin J Comber
(74) *Attorney, Agent, or Firm* — Taft Stettinius & Hollister LLP; J. Bruce Schelkopf (57) ABSTRACT

Unique systems, methods, techniques and apparatuses of inrush current detection and reduction are disclosed. One exemplary embodiment is a method for transmitting power to a load comprising operating a solid-state switching device of a power distribution network device with a microcontroller-based controller, the solid-state switching device including a gate and structured to receive a signal with the gate so as to control the switching device to receive power from a power source and selectively provide power including an output current to the load; detecting an overcurrent condition in the output current; operating the solid-state switching device in order to determine the load is a capacitive load in a charging condition in response to detecting an overcurrent condition; and operating the solid-state switching device so as to reduce the magnitude of the output current during the charging condition.

26 Claims, 7 Drawing Sheets

(56) References Cited

U.S. PATENT DOCUMENTS

| | | |
|---|---|---|
| 2002/0135237 A1 | 9/2002 | Baker |
| 2005/0013079 A1 | 1/2005 | Mitsuda |
| 2009/0295226 A1 | 12/2009 | Hodges et al. |
| 2011/0216461 A1 | 9/2011 | Pellegrino |
| 2014/0016235 A1 | 1/2014 | Koshizuka et al. |
| 2015/0311691 A1 | 10/2015 | Sugiura |
| 2016/0172844 A1* | 6/2016 | van Dijk ............... H02H 9/025 361/91.5 |

FOREIGN PATENT DOCUMENTS

| | | |
|---|---|---|
| WO | 2015124885 A1 | 8/2015 |
| WO | 2016000774 A1 | 9/2016 |
| WO | 2017151521 A1 | 9/2017 |

OTHER PUBLICATIONS

Handt et al.; Intelligent, Compact and Robust Semiconductor Circuit Breaker Based on Silicon Carbide Devices PESC 2008; Aug. 8, 2008; 6 pgs.; IEEE Piscataway, New Jersey.

International Search Report and Written Opinion, PCT Appln. No. PCT/US2018/057491, dated Jan. 29, 2019, 8 pgs.

* cited by examiner

INRUSH CURRENT DETECTION AND CONTROL WITH SOLID-STATE SWITCHING DEVICES

BACKGROUND

The present disclosure relates generally to inrush current protective devices. A protective device, such as a solid-state circuit breaker, detects current spikes in a power distribution system. Current spikes due to a short circuit fault should cause the protection device to trip, interrupting the flow of current through the protection device. Other events, such as a capacitive load being turned on can also cause a current spike, known as inrush current. Unlike a current spike caused by a short circuit fault, a current spike caused by a charging capacitive load should not cause the protective device to trip. To reduce inrush current, some capacitive loads are initially charged using a charging circuit which includes a current limiting resistor. Some power systems that do not reduce inrush current cause protective devices to trip in response to inrush current. Existing protective devices suffer from a number of shortcomings and disadvantages. There remain unmet needs including reducing power losses, reducing power system interruption, and increasing protective device longevity. For instance, charging circuits waste power dissipated in the current limiting resistor in order to reduce inrush current to safe levels. Furthermore, some protective devices cannot differentiate between inrush current and fault current. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for inrush current detection and reduction. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
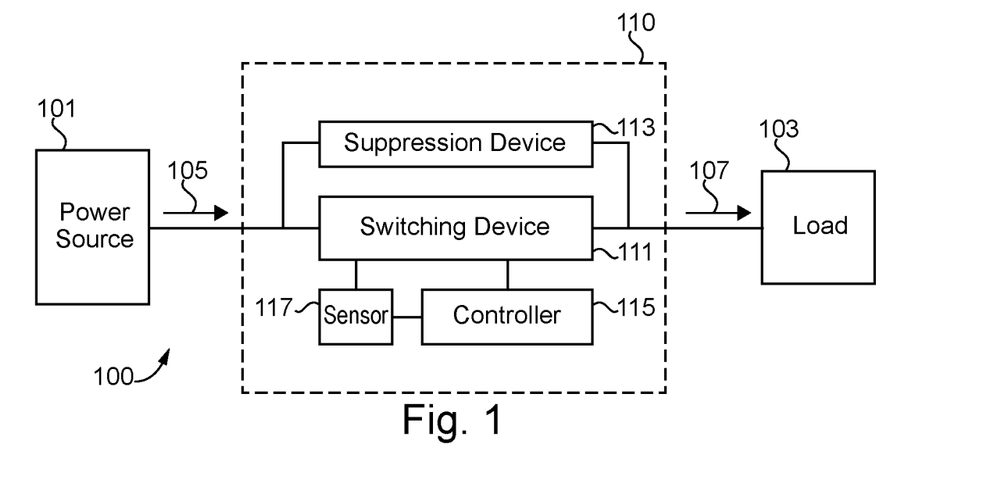
FIG. 1 illustrates an exemplary protective device.

With reference to FIG. 1 there is illustrated a power system 100 including an exemplary protective device 110. It shall be appreciated that system 100 may be implemented in a variety of applications, including alternating current (AC) transmission systems, AC distribution systems, direct current (DC) transmission systems, DC distribution systems, high voltage systems, medium voltage systems, and low voltage systems, to name but a few examples. It shall also be appreciated that the topology of system 100 is illustrated for the purpose of explanation and is not intended as a limitation of the present disclosure.

System 100 includes a power source 101 coupled to protective device 110. Power source 101 may be structured to provide single phase AC power, multiphase AC power, or DC power. Power source 101 may be a power network or a device structured to generate power. System 100 also includes a capacitive load 103 structured to receive power from power source 101 by way of protective device 110. Load 103 may be a battery-based energy storage system, a capacitor bank, an electric vehicle, a parasitic capacitance of a load, or any other type of capacitive load, to name but a few examples. In certain embodiments, power system devices, such as AC/DC or DC/AC power converters, may be coupled between protective device 110 and load 103.

Protective device 110 is structured to receive power with an input current 105 from power source 101 and selectively provide power with an output current 107 to load 103. Protective device 110 may be a circuit breaker, a residual current device, a contactor, a relay, a power controller, a power switch, or a wall receptacle, to name but a few examples. Protective device 110 includes a switching device 111, a suppression device 113, a controller 115, and a sensing device 117.

Switching device 111 is structured to allow or interrupt the flow of current through device 110 in response to activation signals from controller 115 received at a gate of switching device 111. Device 111 includes at least one solid-state switch. For example, device 111 may include an insulated gate bipolar transistor (IGBT), junction gate field-effect transistor (JFET) bipolar junction transistors (BJT), metal oxide semiconductor field effect transistor (MOSFET), silicon MOSFET, gate turn-off thyristor (GTO), MOS-controlled thyristors (MCT), integrated gate-commutated thyristors (IGCT), silicon carbide (SiC) switching device, or gallium nitride (GaN) switching device, to name but a few examples.

In certain embodiments, switching device 111 includes a mechanical switch coupled in series with the solid-state switch. For example, in an application requiring galvanic isolation, a mechanical switch would open following the solid-state switch interrupting a short-circuit current flowing from power source 101 to load 103.

Suppression device 113, coupled in parallel with switching device 111, is structured to reduce voltage transients in response to receiving a voltage above a threshold value. The voltage threshold value of suppression device 113 is below the voltage capacity of switching device 111 and greater than nominal system voltage. For example, if switching device 111 has a voltage capacity of 600V and nominal system voltage is 240V, the voltage threshold value of suppression device 113 may be 525V or 550V, to name but a few examples. Suppression device 113 may be a metal oxide varister (MOV), a resistive-capacitive snubber circuit, or a transient voltage suppressing (TVS) diode. In certain embodiments, protective device 110 may not include suppression device 113.

Sensing device 117 is in communication with controller 115 and structured to transmit signals to controller 115 corresponding to electrical characteristics of device 110. For example, sensing device 117 may be a sensor structured to measure voltage or current, such as a Hall-effect current sensor, a sense resistor current sensor, Giant Magneto Resistive (GMR) current sensor, or a Rogowski coil current sensor, to name but a few examples. Sensing device 117 may alternatively be a current transformer or voltage transformer. Sensing device 117 may be structured to measure the power input to device 110 from power source 101 or the power output to load 103 from device 110. Sensing device 117 may be structured to measure line-to-ground or line-to-line voltage. Sensing device 117 may be structured to measure input current 105 or output current 107. In certain embodiments, sensing device includes more than one sensor or transformer, and is structured to measure both current and voltage.

Controller 115 is structured to operate switching device 111 so as to detect and reduce inrush current flowing through protective device 110 toward load 103 using signals from sensing device 117. As part of detecting inrush current, controller 115 is structured to differentiate between types of fault current, such as short circuit current and inrush current. As described in more detail below, controller 115 is structured to enter a current classification mode in response to detecting an overcurrent condition such as a current spike, during which controller 115 operates switching device 111 by transmitting activation signals including power pulses or power with specific output voltages to the gate of switching device 111. Controller 115 then uses signals from sensing device 117 to determine whether the current spike is a result of the operation of a capacitive load.

Once controller 115 determines a current spike is inrush current, controller 115 enters an inrush current reduction mode, where controller 115 operates switching device 111 so as to reduce the amplitude of inrush current flowing through device 110. If controller 115 determines a current spike is a fault condition, controller 115 operates switching device 111 so as to interrupt output current 107 until the fault condition is cleared. It shall be appreciated that any or all of the foregoing features of protective device 110 may also be present in the other protective devices 110 disclosed herein.

Figure 2:
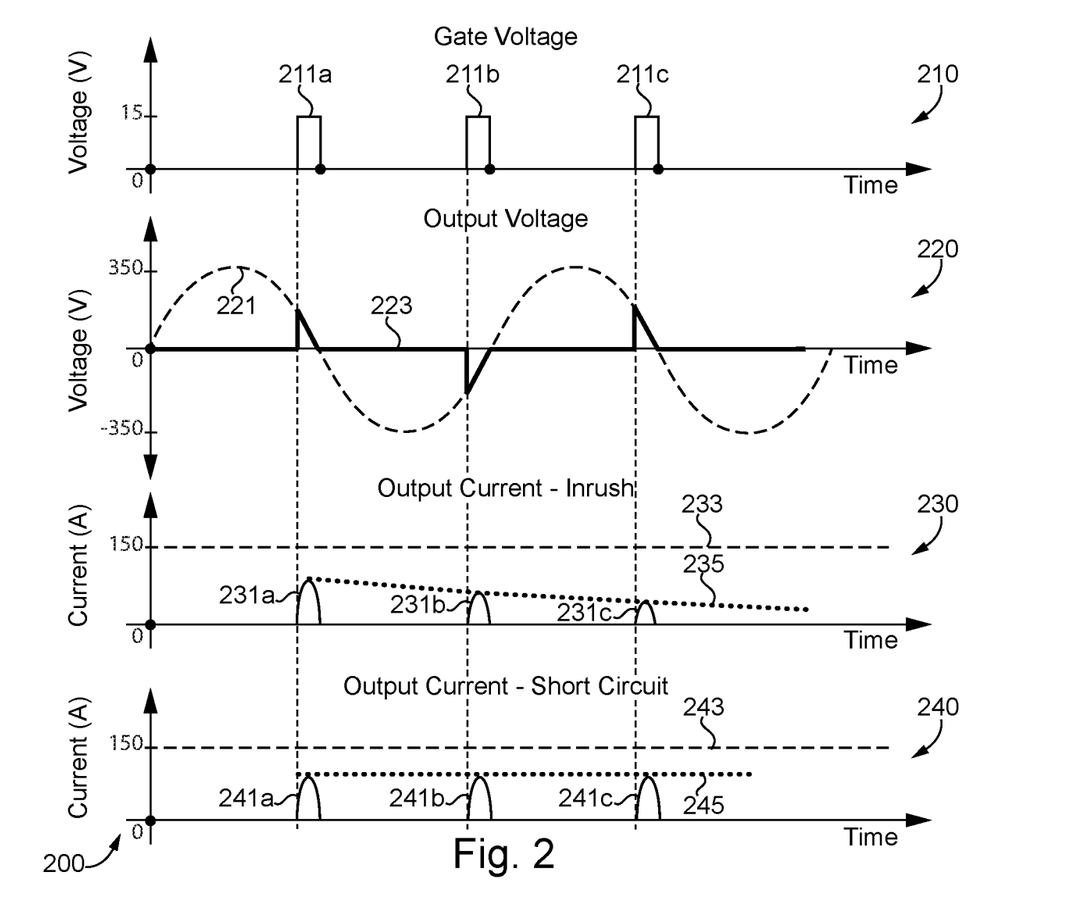
FIG. 2-3 are graphs illustrating inrush current detection processes implemented by an exemplary protective device incorporated into an AC power system.

With reference to FIG. 2 there is a plurality of graphs 200 illustrating the operation of an exemplary protective device, such as protective device 110 in FIG. 1, in an AC power system during an exemplary current classification mode. The plurality of graphs 200 includes graphs 210, 220, 230, and 240. Graph 210 includes a series of lines 211a-211c representing an activation signal including a series of evenly spaced, fixed-width gate pulses generated by controller 115 and transmitted to the gate of switching device 111.

Graph 220 includes a line 221 representing the voltage of the power received by protective device 110 and a line 223 representing the voltage of the power transmitted to load 103 by protective device 110.

Graph 230 includes a series of lines 231a-231c representing output current 107 during the series of gate pulses 211a-211c. As indicated by trend line 235, the peak current magnitude of output current 107 associated with each gate pulse in the series is less than the peak current magnitude associated with the previous gate pulse. In response to measuring the decreasing peak current magnitudes, controller 115 determines the overcurrent condition is being caused by inrush current.

It is important to note the width of gate pulses 211a-211c are determined such that the peak current magnitudes do not exceed a line 233 representing short circuit current limit, which may be 10-20 times greater than nominal current. As illustrated in graph 240, a system with a nominal current of 15 A may have a short circuit current limit of 150 A.

The maximum width of a gate pulse may be determined using an estimated capacitance of load 103 to estimate peak current over a particular interval. In order to estimate capacitance, the following equation may be used, where C is estimated load capacitance, $i_c$ is measured current through the load, and $$\frac{dt}{dv}$$

is the inverse of change in voltage across the load over time:

$$C = i_C * \frac{dt}{dv} \quad (1)$$

It shall be appreciated that the foregoing method of determining maximum gate pulse width may be present in the other current classification and current reduction techniques disclosed herein.

Graph 240 includes a series of lines 241a-241c representing output current 107 during the series of gate pulses 211a-211c. As indicated by trend line 245, the peak current magnitude associated with each gate pulse in the series is substantially similar. In response to measuring the current magnitudes, controller 115 determines the overcurrent condition is being caused by a short circuit current and interrupts output current 107.

Figure 3:
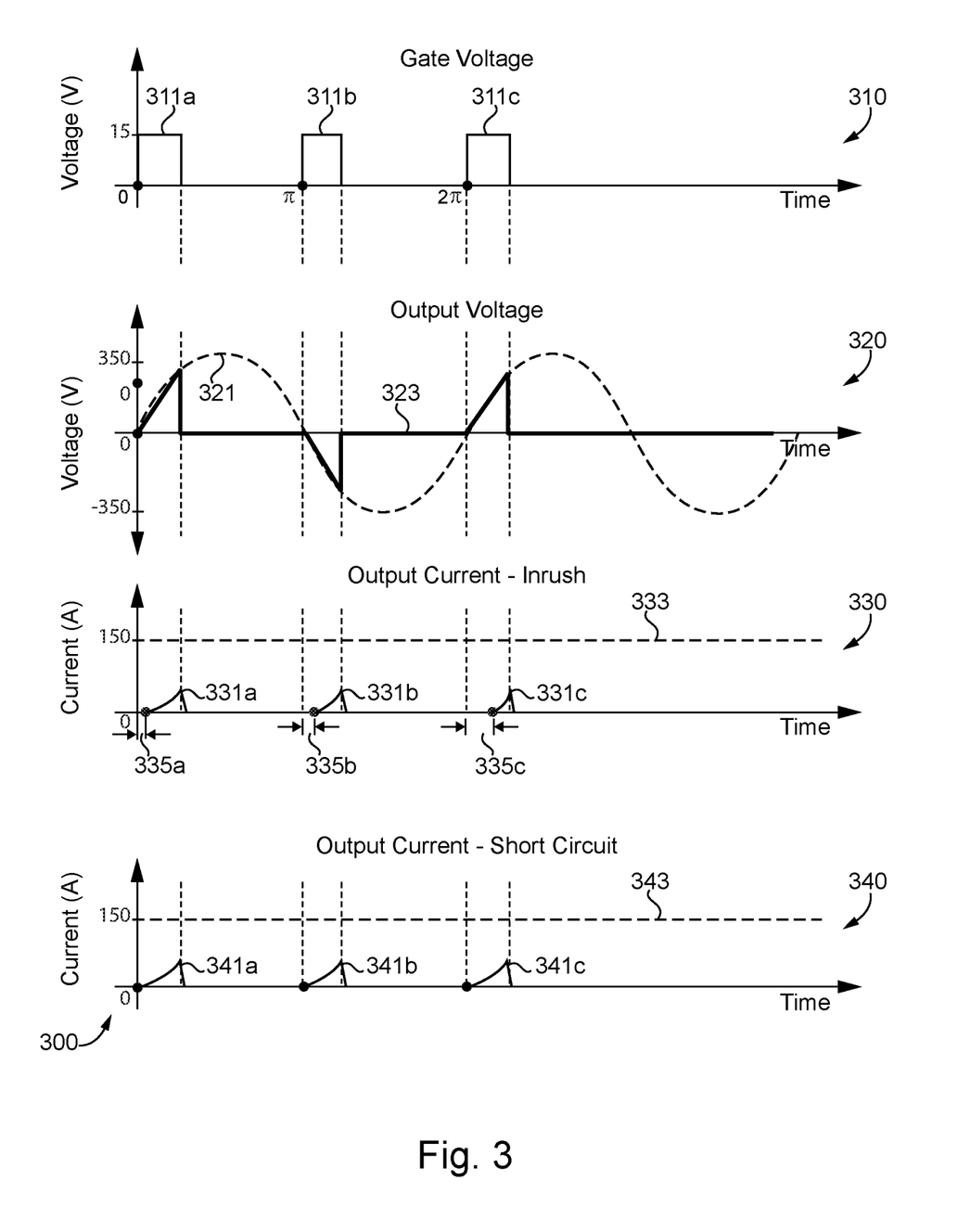

With reference to FIG. 3 there is a plurality of graphs 300 illustrating the operation of an exemplary protective device, such as protective device 110 in FIG. 1, in an AC power system during an exemplary current classification mode. The plurality of graphs 300 includes graphs 310, 320, 330, and 340. Graph 310 includes series of lines 311a-311c representing an activation signal including a series of evenly spaced, fixed width gate pulses generated by controller 115 and transmitted to the gate of switching device 111.

Graph 320 includes a line 321 representing the voltage of the power received by protective device 110 and a line 323 representing the voltage of the power transmitted to load 103 by protective device 110.

Graph 330 includes a series of lines 331a-331c representing output current 107 during the series of gate pulses 311a-311c each associated with a time delay 335a-335c between the start of each gate pulse and the output current 107 increase. As indicated by time delays 335a-335c, the length of time delays is increasing with each gate pulse. In response to measuring the increasing time delay lengths, controller 115 determines the overcurrent condition is being caused by inrush current. It is important to note the width of gate pulses 311a-311c are determined such that the peak current magnitudes do not exceed a line 333 representing short circuit current limit.

Graph 340 includes a series of lines 341*a*-341*c* representing output current 107 in during the series of gate pulses 311*a*-311*c*. For each gate pulse, output current 107 increases begins immediately or with a minimal time delay once each gate pulse begins. In response to measuring no time delays or minimal time delays, controller 115 determines the overcurrent condition is being caused by a short circuit current. It is important to note the width of gate pulses 311*a*-311*c* are determined such that the peak current magnitudes do not exceed a line 343 representing short circuit current limit.

Figure 4:
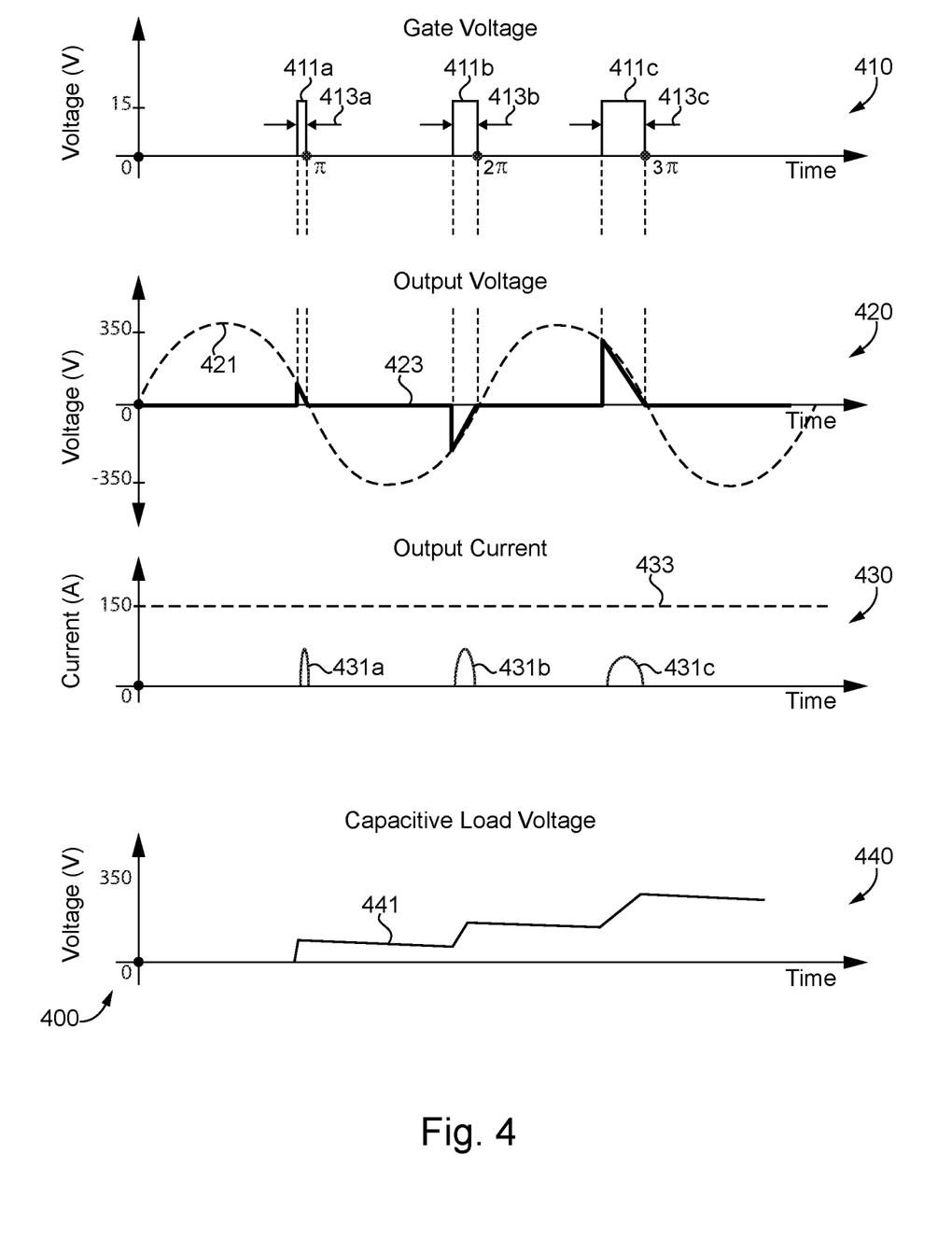
FIG. 4-5 are graphs illustrating inrush current reduction processes implemented by an exemplary protective device incorporated into an AC power system.

With reference to FIG. 4 there is a plurality of graphs 400 illustrating the operation of an exemplary protective device, such as protective device 110 in FIG. 1, in an AC power system during an exemplary inrush current reduction mode. The plurality of graphs 400 includes graphs 410, 420, 430, and 440. Graph 410 includes a series of line 411*a*-*c* representing an activation signal including a series of increasing width gate pulses generated by controller 115 and transmitted to the gate of switching device 111.

Graph 420 includes a line 421 representing the voltage of the power received by protective device 110 and a line 423 representing the voltage of the power transmitted to load 103 by protective device 110. For each gate pulse of graph 410, the start time begins earlier in each half cycle of voltage 421.

Graph 430 includes a series of lines 431*a*-431*c* representing output current 107 during gate pulses 411*a*-411*c*. Each gate pulse terminates during a substantially zero current condition so as to not cause the activation of suppression device 113. For example, a substantially zero current condition may be less than 5 A. It is important to note the width of gate pulses 411*a*-411*c* are determined such that the peak current magnitudes do not exceed a line 433 representing short circuit current limit. Since switching device is turned off during a zero current condition, suppression device 113 is not activated during the inrush current reduction mode.

Graph 440 includes a line 441 representing the voltage across capacitive load 103. As output current 107 flows to load 103, voltage increases. Controller 115 continues to operate in inrush current reduction mode until voltage 441 reaches a threshold. The voltage threshold corresponds to a charging status of load 103. For example, the voltage threshold may correspond to load 103 being fully charged.

Figure 5:
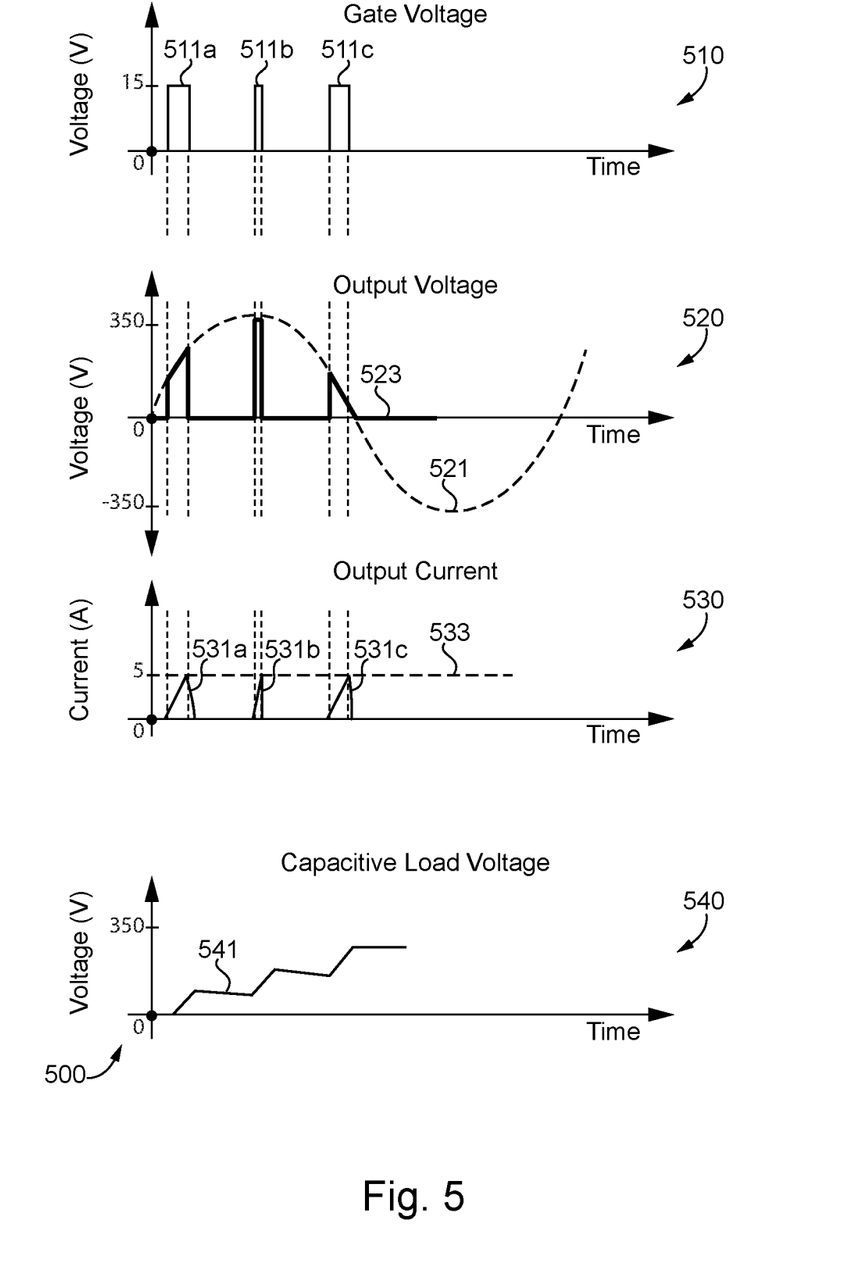

With reference to FIG. 5 there is a plurality of graphs 500 illustrating the operation of an exemplary protective device, such as protective device 110 in FIG. 1, in an AC power system during an exemplary inrush current reduction mode. The plurality of graphs 500 includes graphs 510, 520, 530, and 540. Graph 510 includes a series of line 511*a*-*c* representing an activation signal including a series of varying width gate pulses generated by controller 115 and transmitted to the gate of switching device 111. The frequency of gate pulses is greater than the frequency of power transmitted to load 103 from device 110.

Graph 520 includes a line 521 representing the voltage of the power received by protective device 110 and a line 523 representing the voltage of the power transmitted to load 103 by protective device 110.

Graph 530 includes a series of lines 531*a*-431*c* representing output current 107 during gate pulses 511*a*-411*c*. Each gate pulse terminates in response to output current 107 reaching a current threshold 533. The value of current threshold 533 is configured so that terminating a gate pulse at or below current threshold 533 does not cause the activation of suppression device 113. For example, current threshold 533 may be 5 A.

Graph 540 includes a line 541 representing the voltage across capacitive load 103. As output current 107 flows to load 103, voltage increases. Controller 115 continues to operate in inrush current reduction mode until voltage 541 reaches a threshold. The voltage threshold corresponds to a charging status of load 103. For example, the voltage threshold may correspond to load 103 being fully charged.

Figure 6:
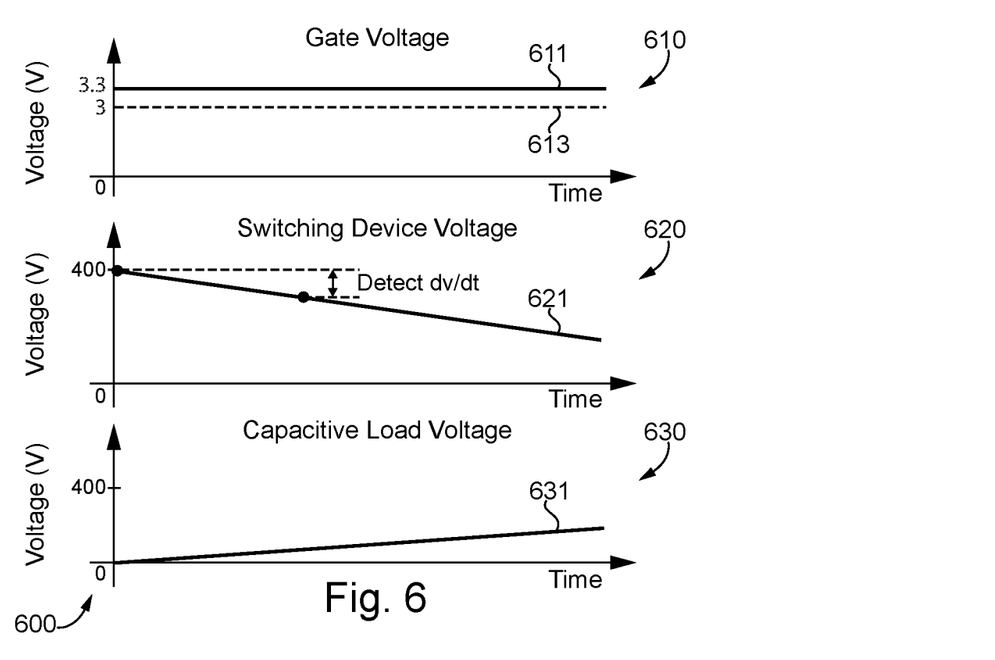
FIGS. 6-9 are graphs illustrating inrush current detection and reduction processes implemented by an exemplary protective device incorporated into a DC power system.

With reference to FIG. 6, there is a plurality of graphs 600 illustrating operation of an exemplary protective device, such as protective device 110 in FIG. 1, during an exemplary current classification mode and an exemplary current reduction mode in a DC power system. The plurality of graphs 600 include graphs 610, 620, and 630. Graph 610 includes line 611 representing an activation signal with a gate voltage and a line 613 representing gate threshold voltage. To name a few non-limiting examples, gate voltage threshold may be between 2.7V-3.3V or 6V. Gate voltage 611 is greater than, but substantially close to, gate voltage threshold. For example, gate voltage may be 3.1V or 3.2V where gate threshold voltage is 3V. When gate voltage is substantially close to the gate threshold voltage, such as within 10% of gate threshold voltage, as illustrated in graph 610, switching device 111 acts as a resistive device. For example, switching device 111, while acting as a resistive device, may have a resistance value between 10-1000 ohms.

Graph 620 includes a line 621 representing voltage across switching device 111 as the gate voltage 611 in graph 610 is applied to the gate of switching device 111. Controller 115 is configured to measure the change in voltage across switching device 111 over time using sensing device 117. If voltage 621 decreases over time, controller 115 determines the detected overcurrent condition in output current 107 current is due to a charging capacitive load. In response to detecting the charging capacitive load, controller 115 exits current classification mode and enters current reduction mode. In current reduction mode, controller 115 continues to output gate voltage 611 with a magnitude substantially close to the gate threshold voltage until the capacitive load is charged. If voltage 621 does not decrease over time, controller 115 determines the detected overcurrent condition in output current 107 current is due to another fault condition and interrupts the flow of output current 107.

Graph 630 includes a line 631 representing the voltage across capacitive load 103. As output current 107 flows to load 103, voltage increases. Controller 115 continues to operate in inrush current reduction mode until voltage 631 reaches a threshold. The voltage threshold corresponds to a charging status of load 103. For example, the voltage threshold may correspond to load 103 being fully charged. The charging rate of load 103 depends on output current 107. While charging load 103, output current 107 depends on switching device 111 resistance which is controlled by the gate voltage applied to the gate of switching device 111. The range of gate voltages depends on the power dissipation capability and thermal design of switching device 111, since excessive power dissipation during the charging process can damage switching device 111.

Figure 7:
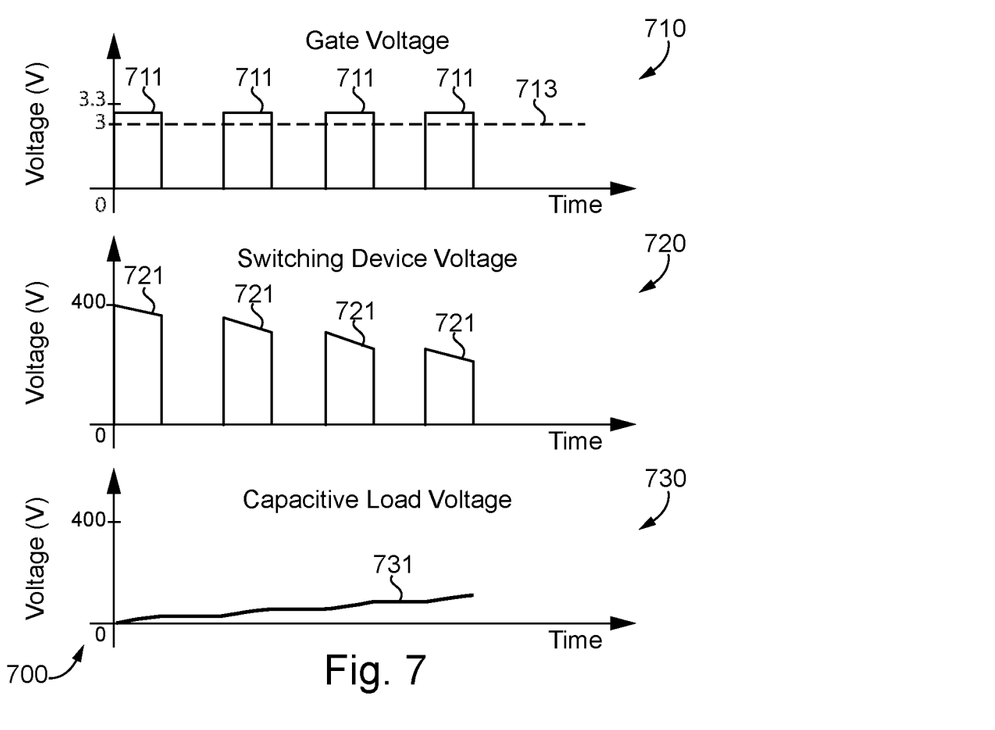

With reference to FIG. 7, there is a plurality of graphs 700 illustrating operation of an exemplary protective device, such as protective device 110 in FIG. 1, during an exemplary current classification mode and an exemplary current reduction mode in a DC power system. The plurality of graphs 700 include graphs 710, 720, and 730. Graph 710 includes line 711 representing an activation signal including a series of gate pulses with a fixed gate voltage and a line 713 representing gate threshold voltage. Each gate pulse 711 has a gate voltage greater than, but substantially close to, gate voltage threshold 713. When gate voltage is substantially close to the gate threshold voltage, as illustrated in graph 710, switching device 111 acts as a resistive device. In certain embodiments, the time period between each gate pulse 711 is effective to allow switching device 111 to cool and remain below an operating temperature threshold.

Graph 720 includes a series of lines 721 representing voltage across switching device 111 as the gate pulses of signal 711 in graph 710 is applied to the gate of switching device 111. Controller 115 is configured to measure the change in voltage across switching device 111 over time using sensing device 117. If voltage 721 decreases over time during one or more gate pulses 711, controller 115 determines the detected overcurrent condition in output current 107 current is due to a charging capacitive load. In response to detecting the charging capacitive load, controller 115 exits current classification mode and enters current reduction mode. In current reduction mode, controller 115 continues to output the series of gate pulses 711 with a gate voltage substantially close to the gate threshold voltage until the capacitive load is charged. If voltage 721 does not decrease over time, controller 115 determines the detected overcurrent condition in output current 107 current is due to another fault condition and interrupts the flow of output current 107.

Graph 730 includes a line 731 representing the voltage across capacitive load 103. As output current 107 flows to load 103, voltage increases. Controller 115 continues to operate in inrush current reduction mode until voltage 731 reaches a threshold. The voltage threshold corresponds to a charging status of load 103. For example, the voltage threshold may correspond to load 103 being fully charged. The operation of protective device 110 as illustrated by the plurality of graphs 700 is preferred where the capacitance of load 103 is high, such a load with a capacitance greater than 100 uF.

Figure 8:
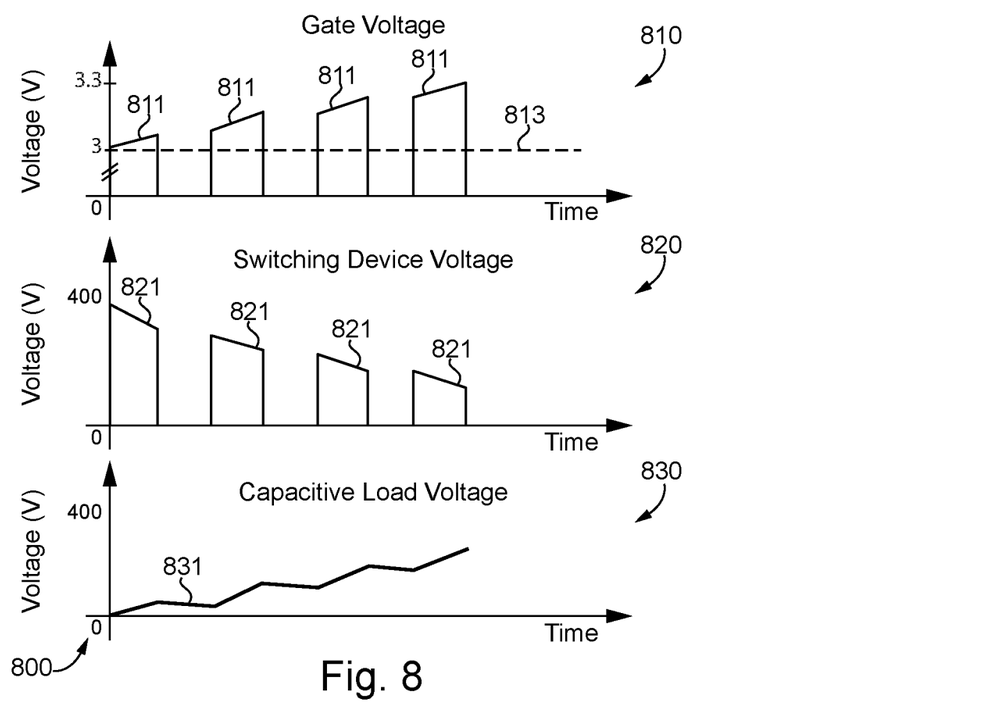

With reference to FIG. 8, there is a plurality of graphs 800 illustrating operation of an exemplary protective device, such as protective device 110 in FIG. 1, during an exemplary current classification mode and an exemplary current reduction mode in a DC power system. The plurality of graphs 800 include graphs 810, 820, and 830. Graph 810 includes line 811 representing an activation signal including a series of gate pulses with a gate voltage and a line 813 representing gate threshold voltage. Each gate pulse 811 has an increasing gate voltage and the first gate pulse has an initial gate voltage greater than, but substantially close to, gate voltage threshold 813. When gate voltage is substantially close to the gate threshold voltage, as illustrated in graph 810, switching device 111 acts as a resistive device. Though the voltage of each gate pulse 811 is increasing, the voltage of each pulse is close enough to the gate threshold voltage such that switching device 111 acts as a resistive device.

Graph 820 includes a series of lines 821 representing voltage across switching device 111 as gate pulses 811 in graph 810 is applied to the gate of switching device 111. Controller 115 is configured to measure the change in voltage across switching device 111 over time using sensing device 117. If voltage 821 decreases over time during one or more gate pulses 811, controller 115 determines the detected overcurrent condition in output current 107 current is due to a charging capacitive load. In response to detecting the charging capacitive load, controller 115 exits current classification mode and enters current reduction mode. In current reduction mode, controller 115 continues to output the series of gate pulses 811 with an increasing gate voltage substantially close to the gate threshold voltage until the capacitive load is charged. If voltage 821 does not decrease over time, controller 115 determines the detected overcurrent condition in output current 107 current is due to another fault condition and interrupts the flow of output current 107.

Graph 830 includes a line 831 representing the voltage across capacitive load 103. As output current 107 flows to load 103, voltage 831 increases. Controller 115 continues to operate in inrush current reduction mode until voltage 831 reaches a threshold. The voltage threshold corresponds to a charging status of load 103. For example, the voltage threshold may correspond to load 103 being fully charged. The operation of protective device 110 as illustrated by the plurality of graphs 800 is preferred where the capacitance of load 103 is high, such a load with a capacitance greater than 100 uF.

Figure 9:
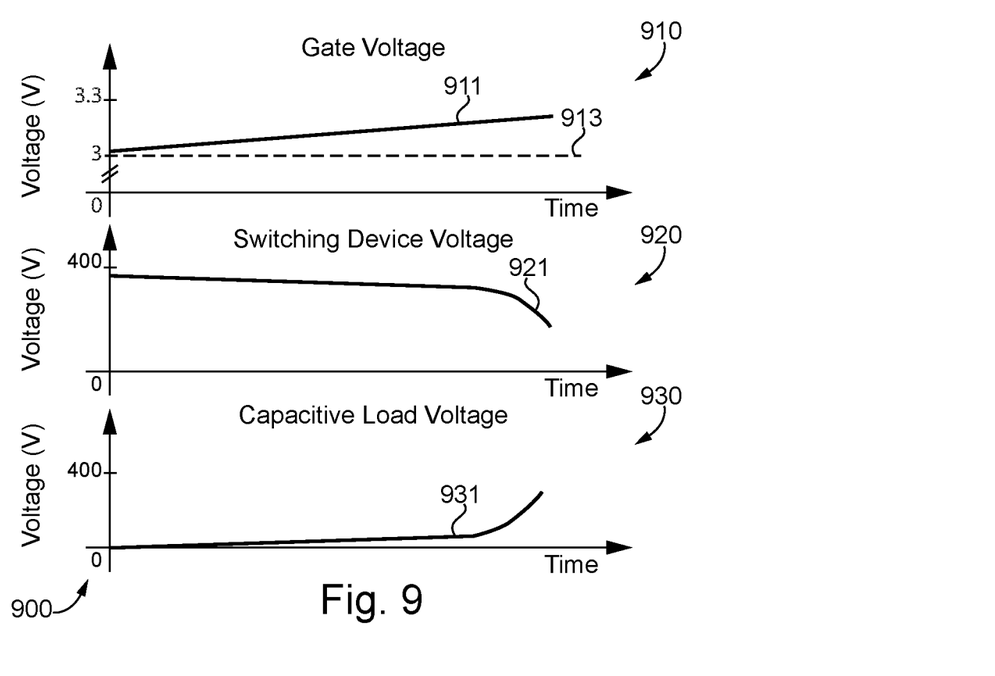

With reference to FIG. 9, there is a plurality of graphs 900 illustrating operation of an exemplary protective device, such as protective device 110 in FIG. 1, during an exemplary current classification mode and an exemplary current reduction mode in a DC power system. The plurality of graphs 900 include graphs 910, 920, and 930. Graph 910 includes line 911 representing an activation signal with an increasing gate voltage and a line 913 representing gate threshold voltage. Gate voltage 911 is greater than, but substantially close to, gate voltage threshold 913. When gate voltage is substantially close to the gate threshold voltage, as illustrated in graph 910, switching device 111 acts as a resistive device.

Graph 920 includes a line 921 representing voltage across switching device 111 as the gate voltage 911 in graph 910 is applied to the gate of switching device 111. Controller 115 is configured to measure the change in voltage across switching device 111 over time using sensing device 117. If voltage 921 decreases over time, controller 115 determines the detected overcurrent condition in output current 107 current is due to a charging capacitive load. In response to detecting the charging capacitive load, controller 115 exits current classification mode and enters current reduction mode. In current reduction mode, controller 115 continues to output gate voltage 921 with a magnitude substantially close to the gate threshold voltage until the capacitive load is charged. If voltage 921 does not decrease over time, controller 115 determines the detected overcurrent condition in output current 107 current is due to another fault condition and interrupts the flow of output current 107.

Graph 930 includes a line 931 representing the voltage across capacitive load 103. As output current 107 flows to load 103, voltage increases. Controller 115 continues to operate in inrush current reduction mode until voltage 931 reaches a threshold. The voltage threshold corresponds to a charging status of load 103. For example, the voltage threshold may correspond to load 103 being fully charged.

Figure 10:
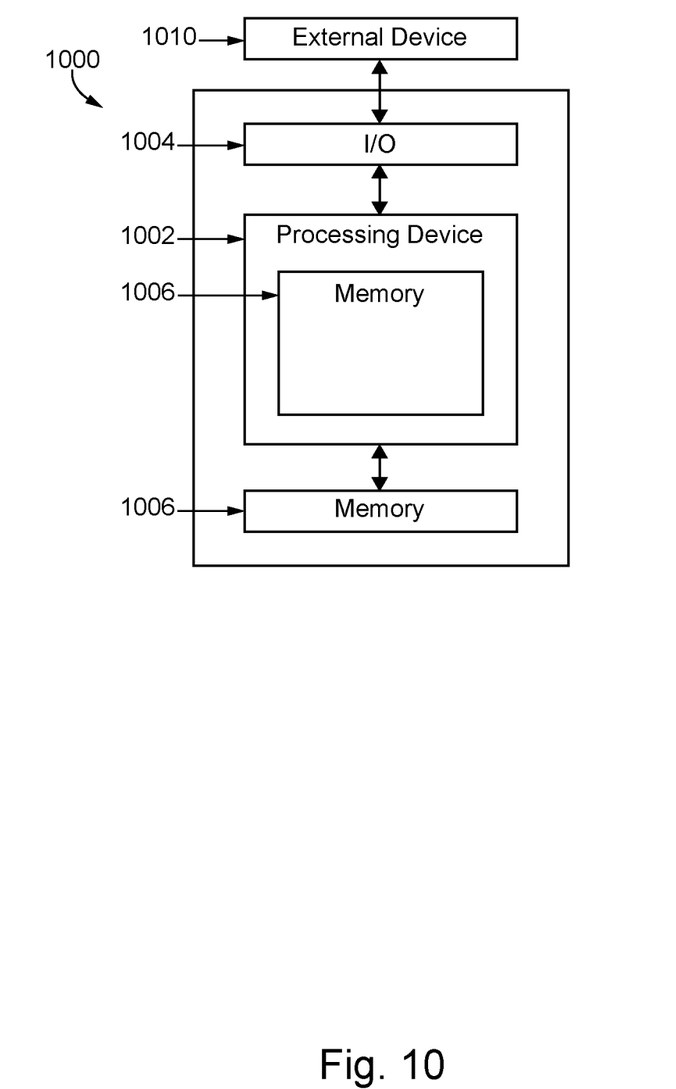
FIG. 10 is a block diagram illustrating an exemplary controller of an exemplary protective device.

With reference to FIG. 10, there is illustrated a schematic block diagram of a computing device 1000. Computing device 1000 is one example of a controller which is used, in different embodiments, in connection with an exemplary protective device, such as protective device 110 shown in FIG. 1. Computing device 1000 includes a processing device 1002, an input/output device 1004, and a memory device 1006. Computing device 1000 may be a stand-alone device, an embedded system, or a plurality of devices structured to perform the functions described with respect to detecting and reducing inrush current. Furthermore, computing device 1000 may communicate with one or more external devices 1010.

Input/output device 1004 enables the computing device 1000 to communicate with external device 1010. For example, input/output device 1004 in different embodiments may be a network adapter, network credential, interface, or a port (e.g., a USB port, serial port, parallel port, an analog port, a digital port, VGA, DVI, HDMI, FireWire, CAT 10, Ethernet, fiber, or any other type of port or interface), to name but a few examples. Input/output device 1004 is comprised of hardware, software, and/or firmware. It is contemplated that input/output device 1004 includes more than one of these adapters, credentials, or ports, such as a first port for receiving data and a second port for transmitting data.

External device 1010 in different embodiments is any type of device that allows data to be input or output from computing device 1000. For example, external device 1010 in different embodiments is a mobile device, a reader device, equipment, a handheld computer, a diagnostic tool, a controller, a computer, a server, a printer, a display, an alarm, a visual indicator, a keyboard, a mouse, a switching device, current sensor, or a touch screen display. Furthermore, it is contemplated that external device 1010 is be integrated into computing device 1000. It is further contemplated that more than one external device is in communication with computing device 1000.

Processing device 1002 in different embodiments is a programmable type, a dedicated, hardwired state machine, or a combination of these. Device 1002 can further include multiple processors, Arithmetic-Logic Units (ALUs), Central Processing Units (CPUs), Digital Signal Processors (DSPs), Field-programmable Gate Array (FPGA), to name but a few examples. For forms of processing device 1002 with multiple processing units, distributed, pipelined, or parallel processing can be used as appropriate. Processing device 1002 may be dedicated to performance of just the operations described herein or may be utilized in one or more additional applications. In the illustrated form, processing device 1002 is of a programmable variety that executes processes and processes data in accordance with programming instructions (such as software or firmware) stored in memory device 1006. Alternatively or additionally, programming instructions are at least partially defined by hardwired logic or other hardware. Processing device 1002 can be comprised of one or more components of any type suitable to process the signals received from input/output device 1004 or elsewhere, and provide desired output signals. Such components may include digital circuitry, analog circuitry, or a combination of both.

Memory device 1006 in different embodiments is of one or more types, such as a solid-state variety, electromagnetic variety, optical variety, or a combination of these forms, to name but a few examples. Furthermore, memory device 1006 can be volatile, nonvolatile, transitory, non-transitory or a combination of these types, and some or all of memory device 1006 can be of a portable variety, such as a disk, tape, memory stick, cartridge, to name but a few examples. In addition, memory device 1006 can store data that is manipulated by processing device 1002, such as data representative of signals received from or sent to input/output device 1004 in addition to or in lieu of storing programming instructions, just to name one example. As shown in FIG. 10, memory device 1006 may be included with processing device 1002 or coupled to processing device 1002, but need not be included with both.

Further written description of a number of exemplary embodiments shall now be provided. One embodiment is a method for transmitting power to a load comprising operating a solid-state switching device of a power distribution network device with a controller, the solid-state switching device including a gate and structured to receive an activation signal with the gate so as to control the solid-state switching device to receive power from a power source and selectively provide power including an output current to the load; detecting an overcurrent condition in the output current; operating the solid-state switching device in order to determine whether the load is a capacitive load in a charging condition in response to detecting an overcurrent condition; and in response determining that the load is a capacitive load in a charging condition, operating the solid-state switching device so as to reduce the magnitude of the output current during the charging condition.

In certain forms of the foregoing method, the act of determining the load is a capacitive load includes transmitting a series of fixed width pulses to the gate wherein the width of each pulse is determined using an estimated capacitance value of the capacitive load. In certain forms, the act of determining the load is a capacitive load includes transmitting a series of pulses to the gate, determining an output current peak corresponding to each pulse of the series of pulses, and determining the output current maximum pulse values are decreasing for the series of pulses. In certain forms, the act of determining the load is a capacitive load includes transmitting a series of pulses to the gate, determining a time delay between the start of each pulse and the start of a rise in output current for each pulse, and determining the time delay is increasing for the series of pulses. In certain forms, the act of determining the load is a capacitive load includes transmitting power to the gate with an initial voltage substantially close to a gate threshold voltage effective to cause the solid-state switching device to act as a resistive device and determining a change in voltage over time of the power flowing through the solid-state switching device. In certain forms, the power transmitted to the gate comprises a series of pulses. In certain forms, the power transmitted to the gate is continuous having an increasing voltage. In certain forms, the power source is an alternating current power source with a first frequency and power distribution network device includes a voltage transient suppression device structured to activate in response to a change in voltage greater than a transient threshold. In certain forms, the act of operating the solid-state switching device so as to reduce the magnitude of the output current includes at least one of applying a series of pulses with increasing width to the gate, wherein the width of each pulse is determined so as not to activate the voltage transient suppression device, and applying a series of pulses to the gate at a second frequency, wherein the second frequency is greater than twice the frequency of the first frequency, wherein each pulse of the series of pulses terminates when the output current exceeds a current threshold, and wherein the current threshold is configured so as to prevent the voltage transient suppression device from activating. In certain forms, operating the solid-state switching device so as to reduce the magnitude of the output current includes transmitting power to the gate with an initial voltage effective to cause the solid-state switching device to act as a resistive device. In certain forms, the power transmitted to the gate comprises a series of pulses. In certain forms, each pulse of the series of pulses comprises a voltage greater than the voltage of a previous pulse. In certain forms, the power transmitted to the gate is continuous having an increasing voltage.

Another exemplary embodiment is a protective device comprising a solid-state switching device structured to be coupled between a power source and a load, structured to selectively provide an output current to the load from the power source, and including a gate; and a controller coupled to the gate of the solid-state switching device and structured to detect an overcurrent condition with a first current magnitude, determine the load is a capacitive load using the solid-state switching device in response to detecting the overcurrent condition, and operate the solid-state switching device so as to charge the load by providing the output current to the load at a second current magnitude less than the first current magnitude.

In certain forms of the foregoing device, the controller is structured to determine the load is a capacitive load by at least one of: transmitting a series of fixed width pulses to the gate wherein the width of each pulse is determined using an estimated capacitance value of the capacitive load; transmitting a series of pulses to the gate, determining an output current peak corresponding to each pulse of the series of pulses, and determining the output current peaks are decreasing for the series of pulses; and transmitting a series of pulses to the gate, determining a time delay between the start of each pulse and the start of a rise in output current for each pulse, and determining the time delay is increasing for the series of pulses. In certain forms, the controller is structured to determine the load is a capacitive load and operate the solid-state switching device so as to charge the load by transmitting power to the gate including a voltage greater than a gate threshold voltage of the solid-state switching device. In certain forms, the voltage greater than the gate threshold voltage is effective to cause the solid-state switching device to act as a resistive device. In certain forms, the power transmitted to the gate is a series of fixed width pulses. In certain forms, operating the solid-state switching device so as to charge the load includes transmitting to the gate a series of varying-width pulses, wherein the width of each pulse is structured to not activate a voltage transient suppression device coupled in parallel with the solid-state switching device.

A further exemplary embodiment is a power distribution system comprising: a sensing device structured to receive data corresponding to magnitude of an electric current transferred from a power source to a load; a protective device structured to selectively allow the electric current between the power source and the load including a solid-state switching device; and a controller coupled with a gate of the solid-state switching device, structured to detect a load charging condition using the data from the sensing device corresponding to operating the solid-state switching device in a current classification mode and structured to operate the solid-state switching device so as to reduce the magnitude of the electric current in response to detecting the load charging condition.

In certain forms of the foregoing system, the controller is structured to operate the solid-state switching device in a current classification mode by transmitting power to the gate of the solid-state switching device with a first voltage greater than a gate voltage threshold of the solid-state switching device and structured to reduce the magnitude of the electric current by transmitting power to the gate of the solid-state switching device with a second voltage greater than the gate voltage threshold of the solid-state switching device, wherein the first voltage and the second voltage are structured to cause the solid-state switching device to operate as a resistive device. In certain forms, the first voltage and second voltage are at least one of an increasing voltage, a series of pulses with a constant pulse voltage, and a series of pulses with an increasing pulse voltage. In certain forms, the protective device includes a voltage suppression device and the controller is structured to operate the solid-state switching device in a current classification mode by transmitting a series of pulses to the gate, each pulse including a width structured so as to not activate the voltage suppression device. In certain forms, the electric current is direct current. In certain forms, the protective device is a circuit breaker, a residual current device, a contactor, or a relay. In certain forms, the controller is structured to operate the solid-state switching device in a current classification mode by transmitting a series of pulses to the gate, each time period between each pulse being structured so as to not cause the solid-state switching device to exceed a temperature threshold.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A method for transmitting power to a load comprising:
operating a solid-state switching device of a power distribution network device with a controller, the solid-state switching device including a gate and structured to receive an activation signal with the gate so as to control the solid-state switching device to receive power from a power source and selectively provide power including an output current to the load;
detecting an overcurrent condition in the output current;
operating the solid-state switching device in order to determine whether the load is a capacitive load in a charging condition in response to detecting an overcurrent condition; and
in response determining that the load is a capacitive load in a charging condition, operating the solid-state switching device so as to reduce the magnitude of the output current during the charging condition.

2. The method of claim 1 wherein the act of determining the load is a capacitive load includes transmitting a series of fixed width pulses to the gate wherein the width of each pulse is determined using an estimated capacitance value of the capacitive load.

3. The method of claim 1 wherein the act of determining the load is a capacitive load includes transmitting a series of pulses to the gate, determining an output current peak corresponding to each pulse of the series of pulses, and determining the output current maximum pulse values are decreasing for the series of pulses.

4. The method of claim 1 wherein the act of determining the load is a capacitive load includes transmitting a series of pulses to the gate, determining a time delay between the start of each pulse and the start of a rise in output current for each pulse, and determining the time delay is increasing for the series of pulses.

5. The method of claim 1 wherein the act of determining the load is a capacitive load includes transmitting power to the gate with an initial voltage substantially close to a gate threshold voltage effective to cause the solid-state switching device to act as a resistive device and determining a change in voltage over time of the power flowing through the solid-state switching device.

6. The method of claim 5 wherein the power transmitted to the gate comprises a series of pulses.

7. The method of claim 5 wherein the power transmitted to the gate is continuous having an increasing voltage.

8. The method of claim 1 wherein the power source is an alternating current power source with a first frequency and power distribution network device includes a voltage transient suppression device structured to activate in response to a change in voltage greater than a transient threshold.

9. The method of claim 8 wherein the act of operating the solid-state switching device so as to reduce the magnitude of the output current includes at least one of:
  applying a series of pulses with increasing width to the gate, wherein the width of each pulse is determined so as not to activate the voltage transient suppression device, and
  applying a series of pulses to the gate at a second frequency, wherein the second frequency is greater than twice the frequency of the first frequency, wherein each pulse of the series of pulses terminates when the output current exceeds a current threshold, and wherein the current threshold is configured so as to prevent the voltage transient suppression device from activating.

10. The method of claim 1 wherein operating the solid-state switching device so as to reduce the magnitude of the output current includes transmitting power to the gate with an initial voltage effective to cause the solid-state switching device to act as a resistive device.

11. The method of claim 10 wherein the power transmitted to the gate comprises a series of pulses.

12. The method of claim 11 wherein each pulse of the series of pulses comprises a voltage greater than the voltage of a previous pulse.

13. The method of claim 10 wherein the power transmitted to the gate is continuous having an increasing voltage.

14. A protective device comprising:
  a solid-state switching device structured to be coupled between a power source and a load, structured to selectively provide an output current to the load from the power source, and including a gate; and
  a controller coupled to the gate of the solid-state switching device and structured to detect an overcurrent condition with a first current magnitude, determine the load is a capacitive load using the solid-state switching device in response to detecting the overcurrent condition, and operate the solid-state switching device so as to charge the load by providing the output current to the load at a second current magnitude less than the first current magnitude.

15. The device of claim 14 wherein the controller is structured to determine the load is a capacitive load by at least one of:
  transmitting a series of fixed width pulses to the gate wherein the width of each pulse is determined using an estimated capacitance value of the capacitive load;
  transmitting a series of pulses to the gate, determining an output current peak corresponding to each pulse of the series of pulses, and determining the output current peaks are decreasing for the series of pulses; and
  transmitting a series of pulses to the gate, determining a time delay between the start of each pulse and the start of a rise in output current for each pulse, and determining the time delay is increasing for the series of pulses.

16. The device of claim 14 wherein the controller is structured to determine the load is a capacitive load and operate the solid-state switching device so as to charge the load by transmitting power to the gate including a voltage greater than a gate threshold voltage of the solid-state switching device.

17. The device of claim 16 wherein the voltage greater than the gate threshold voltage is effective to cause the solid-state switching device to act as a resistive device.

18. The device of claim 17 wherein the power transmitted to the gate is a series of fixed width pulses.

19. The device of claim 14 wherein operating the solid-state switching device so as to charge the load includes transmitting to the gate a series of varying-width pulses, wherein the width of each pulse is structured to not activate a voltage transient suppression device coupled in parallel with the solid-state switching device.

20. A power distribution system comprising:
  a sensing device structured to receive data corresponding to magnitude of an electric current transferred from a power source to a load;
  a protective device structured to selectively allow the electric current between the power source and the load including a solid-state switching device; and
  a controller coupled with a gate of the solid-state switching device, structured to detect a load charging condition using the data from the sensing device corresponding to operating the solid-state switching device in a current classification mode and structured to operate the solid-state switching device so as to reduce the magnitude of the electric current in response to detecting the load charging condition.

21. The power distribution system of claim 20 wherein the controller is structured to operate the solid-state switching device in a current classification mode by transmitting power to the gate of the solid-state switching device with a first voltage greater than a gate voltage threshold of the solid-state switching device and structured to reduce the magnitude of the electric current by transmitting power to the gate of the solid-state switching device with a second voltage greater than the gate voltage threshold of the solid-state switching device, wherein the first voltage and the second voltage are structured to cause the solid-state switching device to operate as a resistive device.

22. The power distribution system of claim 21 wherein the first voltage and second voltage are at least one of an increasing voltage, a series of pulses with a constant pulse voltage, and a series of pulses with an increasing pulse voltage.

23. The power distribution system of claim 20 wherein the protective device includes a voltage suppression device and the controller is structured to operate the solid-state switching device in a current classification mode by transmitting a series of pulses to the gate, each pulse including a width structured so as to not activate the voltage suppression device.

24. The power distribution system of claim 20 wherein the electric current is direct current.

25. The power distribution system of claim 20 wherein the protective device is a circuit breaker, a residual current device, a contactor, or a relay.

26. The power distribution system of claim 20 wherein the controller is structured to operate the solid-state switching device in a current classification mode by transmitting a series of pulses to the gate, each time period between each pulse being structured so as to not cause the solid-state switching device to exceed a temperature threshold.

* * * * *